United States Patent [19]

Kikuchi

[11] Patent Number: 5,697,005
[45] Date of Patent: Dec. 9, 1997

[54] COVER ASSEMBLY FOR APPARATUS

[75] Inventor: Hiroshi Kikuchi, Kanagawa-ken, Japan

[73] Assignee: Canon Kabushiki Kaisha, Tokyo, Japan

[21] Appl. No.: 282,048

[22] Filed: Jul. 28, 1994

[30] Foreign Application Priority Data

Aug. 2, 1993 [JP] Japan ................................ 5-191458
Aug. 2, 1993 [JP] Japan ................................ 5-191462

[51] Int. Cl.$^6$ .................................................. G03B 17/02
[52] U.S. Cl. .................................................. 396/535
[58] Field of Search ........................... 354/288; 396/535, 396/536, 537, 540, 541

[56] References Cited

U.S. PATENT DOCUMENTS

| | | |
|---|---|---|
| 1,613,365 | 1/1927 | Underwood . |
| 1,857,502 | 5/1932 | Fuerst et al. . |
| 3,205,800 | 9/1965 | Peterson .................................... 354/288 |
| 3,958,260 | 5/1976 | Nagasaka . |
| 4,247,600 | 1/1981 | Adachi . |
| 5,313,240 | 5/1994 | Lyon et al. . |
| 5,325,139 | 6/1994 | Matsumoto . |

*Primary Examiner*—David M. Gray
*Attorney, Agent, or Firm*—Robin, Blecker, Daley and Driscoll

[57] ABSTRACT

A cover of an apparatus is composed of a metal part and a synthetic resin molded part. An edge part of the metal part located at a boundary between these cover parts is subjected to a brightening cutting process such as diamond cutting which gives a color tone different from the colors of these cover parts, so that a difference in color between the two cover parts can be made to be less conspicuous.

13 Claims, 6 Drawing Sheets

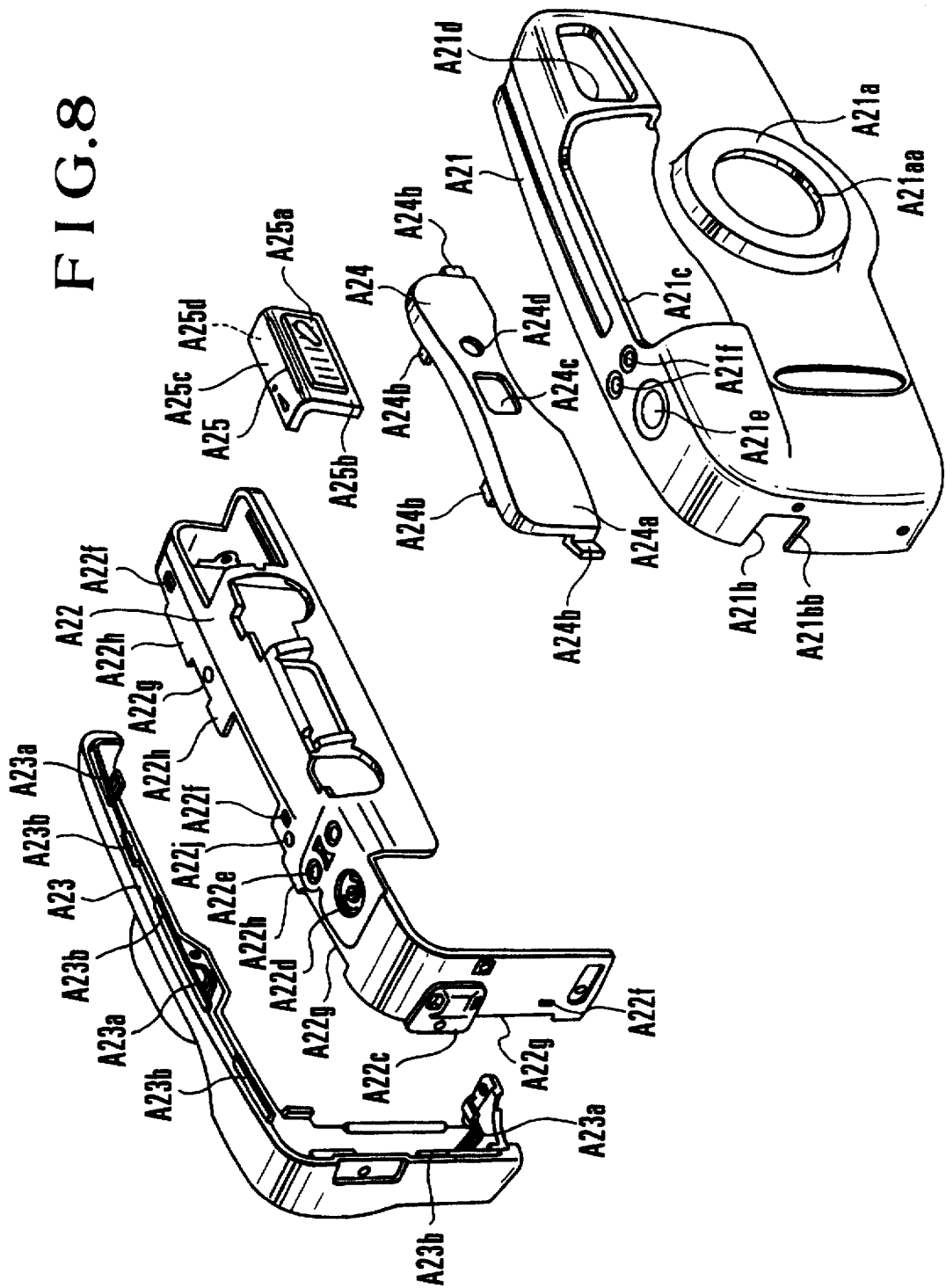

COVER ASSEMBLY FOR APPARATUS

BACKGROUND OF THE INVENTION

1. Field of the Invention

This invention relates to an apparatus having a cover assembly consisting of a metal part and a synthetic resin molded part, and more particularly to a cover assembly which is adapted for a camera.

2. Description of the Related Art

Most of the compact cameras (noninterchangeable lens type cameras) are manufactured in these days to have cover assemblies which are made of synthetic resins by injection molding. The cover assemblies which consist of molded parts made by injection-molding synthetic resins (including a high strength resin called an "engineering plastic") have the following advantages: (i) The synthetic resin (plastic) material can be easily shaped into a complex form designed by abundantly including three-dimensional curved surfaces. (ii) Complex forms can be shaped integrally with the cover parts disposed on the inner side (nonappearance side) of the covers. (iii) The cost of the cover parts is low as they are easy to prepare. (iv) The cover assemblies are much lighter in weight than a cover assembly which is totally made of metal and is, therefore, convenient for carrying. On the other hand, however, the disadvantage of the cover assemblies made of synthetic resin materials lies in that they are prone to be damaged on their surfaces and to be broken or cracked by the impact of falling. To solve this problem, it has been proposed to make a portion of a cover assembly with a metal in such a way as not only to prevent the surface from being damaged or cracked but to upgrade the appearance of the camera and also to permit reduction in size by reducing the thickness of the cover.

However, with the cover assembly made of metal in one part and formed by molding in the other, it is extremely difficult to finish the two parts in the same color, because of the difficulty of quality control over the materials. In cases where a light color is chosen for the appearance, in particular, a difference in color inevitably becomes conspicuous at a boundary between the two different parts. In order to minimize the difference in color, pigments must be very elaborately adjusted and blended in the materials. Besides, it is also extremely difficult to keep the color thus blended unchanged throughout the manufacturing period of the cover assembly.

SUMMARY OF THE INVENTION

It is an object of this invention to provide an apparatus or a camera wherein two parts which constitute a cover assembly are improved to make a color difference between them not conspicuous at a boundary between them.

One aspect of this invention lies in that one of two parts of the cover assembly is formed with a metal while the other part is formed by molding a synthetic resin and, in order to make the difference in color between the metal cover part and the synthetic-resin-molded cover part less conspicuous, an edge part at the boundary between the two cover parts is processed to have a color tone which differs from the colors of the two cover parts of the cover assembly.

The above and other objects and aspects of this invention will become apparent from the following detailed description of embodiments thereof taken in connection with the accompanying drawings.

BRIEF DESCRIPTION OF THE DRAWINGS

FIG. 8 is an exploded oblique view showing a camera arranged as a fourth embodiment of this invention.

DETAILED DESCRIPTION OF THE PREFERRED EMBODIMENTS

Figure 1:
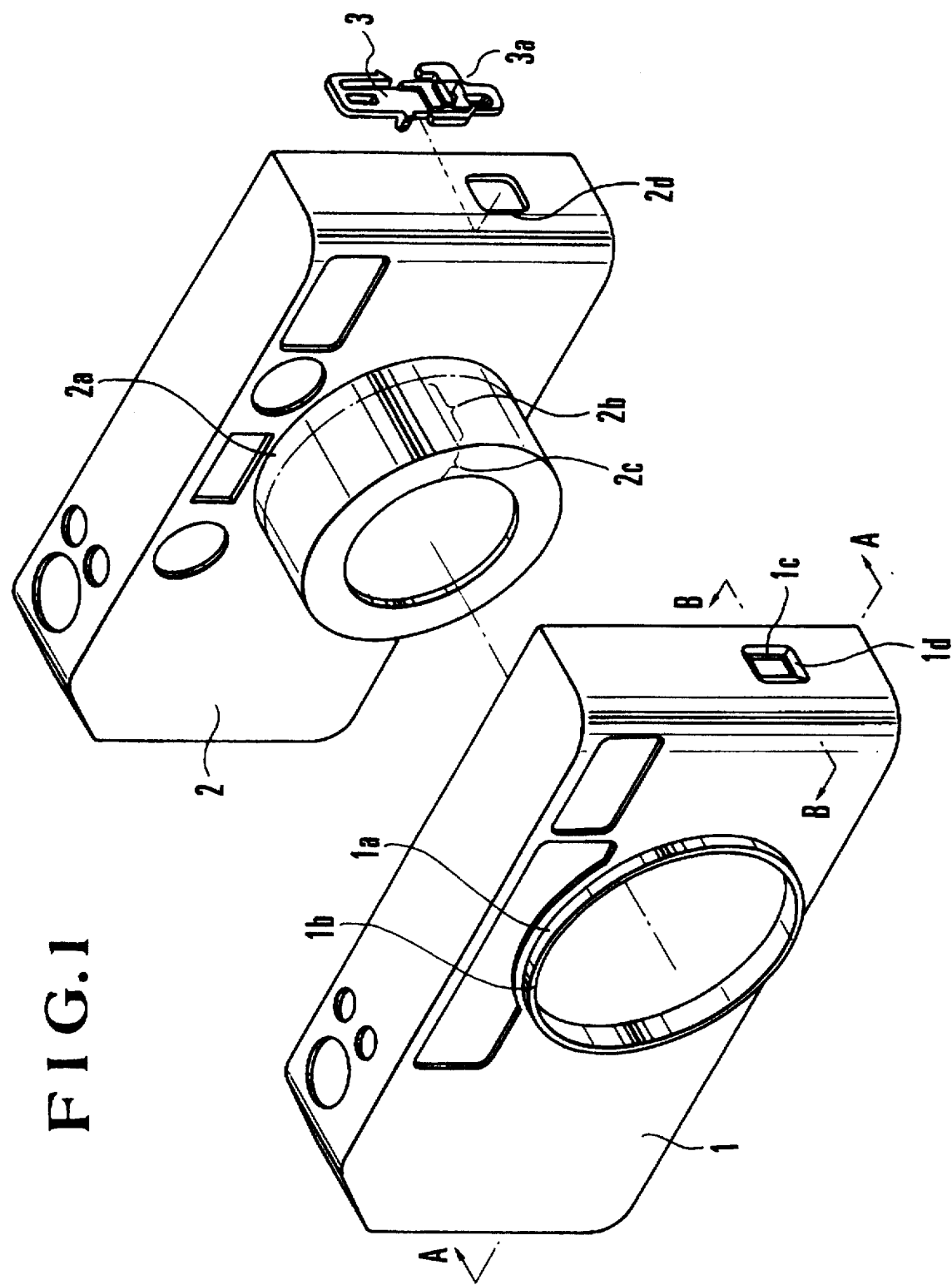
FIG. 1 is an oblique view showing a camera which is a first embodiment of this invention with a front cover and parts therearound shown in an exploded state.
Figure 2A:
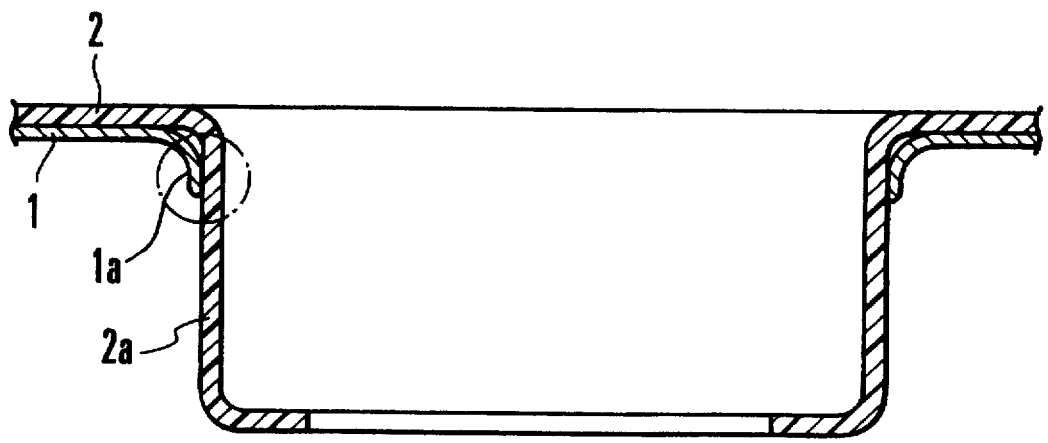
FIG. 2(a) is a sectional view taken along a line A—A shown in FIG. 1.
Figure 2B:
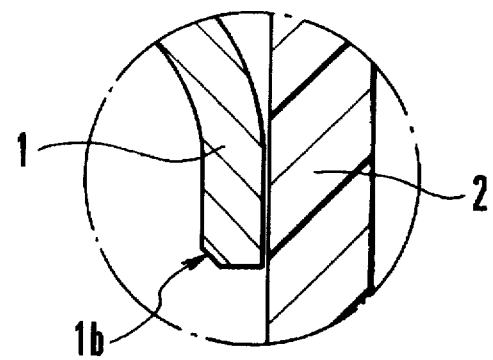
FIG. 2(b) is an enlarged view showing a diamond cut part (processed by brightening cutting) of the covers of the camera.

FIG. 1 shows a front cover of a camera which is arranged as a first embodiment of this invention and parts of the camera arranged around the front cover. FIG. 2(a) is a sectional view taken along a line A—A of FIG. 1. FIG. 2(b) is an enlarged view of a diamond cut part shown in FIG. 2(a).

Referring to FIGS. 1, 2(a) and 2(b), the front cover 1 is made of metal and formed by a drawing process. The front cover 1 has a cylindrical protruding part 1a around a lens barrel. The edge part 1b of the cylindrical protruding part 1a is chamfered by diamond cutting. An inner cover 2 is made of a synthetic resin such as a plastic material and is formed by injection molding. The inner cover 2 has about the same color as the front cover 1 and has a cylindrical protruding part 2a formed around the lens barrel integrally with the inner cover 2. The cylindrical protruding part 2a protrudes to a greater extent than the protruding part 1a of the front cover 1. As shown in FIG. 2(a), when the inner cover 2 and the metal front cover 1 are combined and cemented together, a major portion of the protruding part 2a becomes external appearance parts 2b and 2c. The appearance color of the front cover 1 and that of the appearance parts 2b and 2c of the inner cover 2 are about the same. Since the end part 1b of the front cover 1 is finished by diamond cutting at a boundary between the two parts 1 and 2 which are made of different materials, a slight difference in color between the two parts 1 and 2 due to difference in material is effectively mitigated and made to be less conspicuous by the presence of the diamond cut edge part 1b of the front cover 1.

The same effect is attainable by providing, at the boundary between the two parts of different materials, a part which is arranged to have a different color tone from the colors of the two parts by painting, plating, vapor deposition, an out-sert process, bonding or sticking another member or some other suitable process other than the cutting process. This process not only gives the same effect but also can be carried out without being restricted by the basic color of the materials of the cover parts and can be carried out on one cover part which does not have to be made of metal. The same effect can be attained, for example, by applying a painting, plating, vapor deposition, out-sert process or a process of bonding or sticking another member to an area of the appearance part 2b of the inner cover 2 which is located at the boundary between the front and inner covers 1 and 2.

In the case of this embodiment, the protruding part around the lens barrel is included in the molded part while most of other appearance parts are made of metal. However, the boundary between the cover parts of different materials does not have to be the protruding part for the lens barrel. The boundary part may be set at any other part which is to be exposed to the outside.

Figure 3:
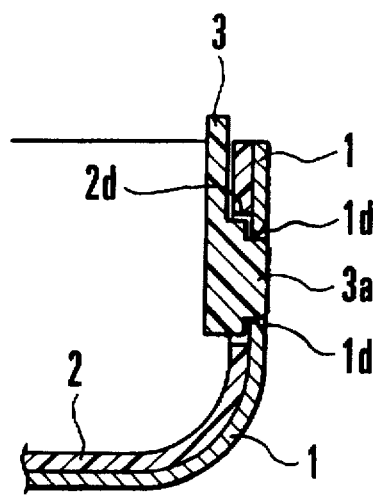
FIG. 3 is a sectional view which is taken along a line B—B of FIG. 1 and shows an arrangement as a second embodiment of this invention.

A second embodiment of this invention is arranged as shown in FIG. 3. FIG. 3 is a sectional view taken along a line B—B of FIG. 1 and shows a part of the second embodiment including an operation member. The basic arrangement of the second embodiment is the same as that of the first embodiment. The front cover (part) 1 which is made of metal is provided with a hole 1c as shown in FIG. 1. The whole edge 1d of the hole 1c is chamfered by diamond cutting. The inner cover (part) 2 which is made of a synthetic resin such as a plastic material is provided with a hole 2d. An outside operation member 3 is arranged to be slid downward in opening a back lid of the camera which is not shown. The outside part 3a of the operation member 3 shows up through the hole 1c. If the outside color of the front cover 1 and the color of the operation member 3 are nearly the same, a part having a color tone different from the colors of the front cover 1 and the operation member 3 can be created at the boundary between them by applying diamond cutting to the edge 1d of the hole 1c which is the boundary between the front cover 1 and the operation member 3, so that the slight difference in color between the two parts of different materials can be mitigated, like in the case of the first embodiment.

Figure 4:
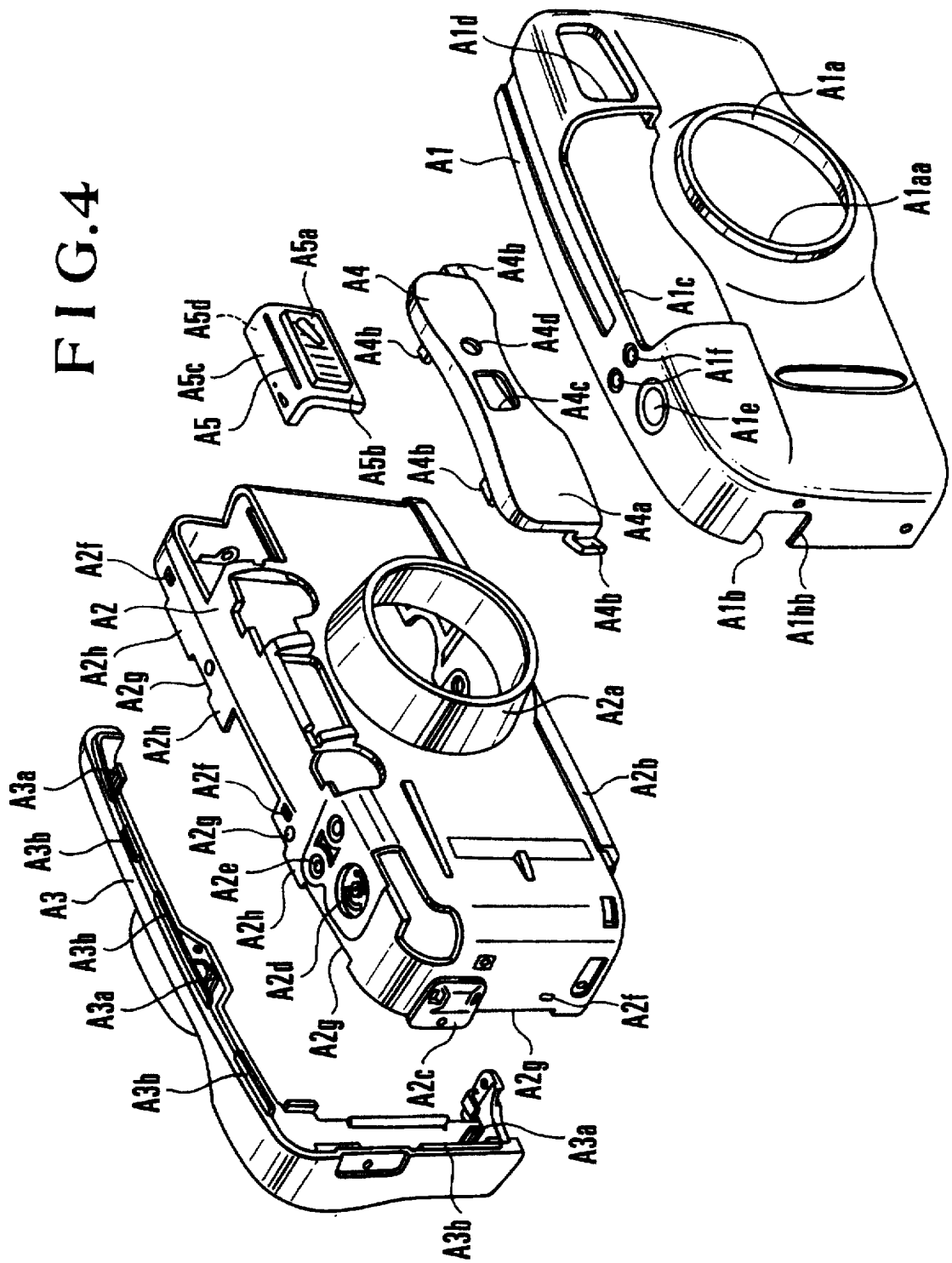
FIG. 4 is an exploded oblique view showing a camera arranged as a third embodiment of this invention.
Figure 5:
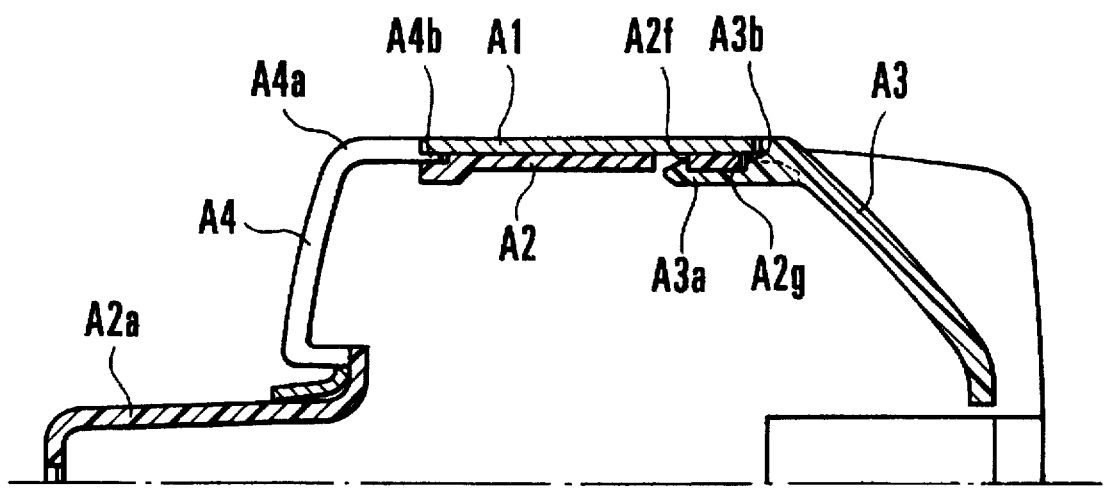
FIG. 5 is a longitudinal sectional view showing a hook claw part arranged to combine the front and rear covers of the camera with each other.
Figure 6:
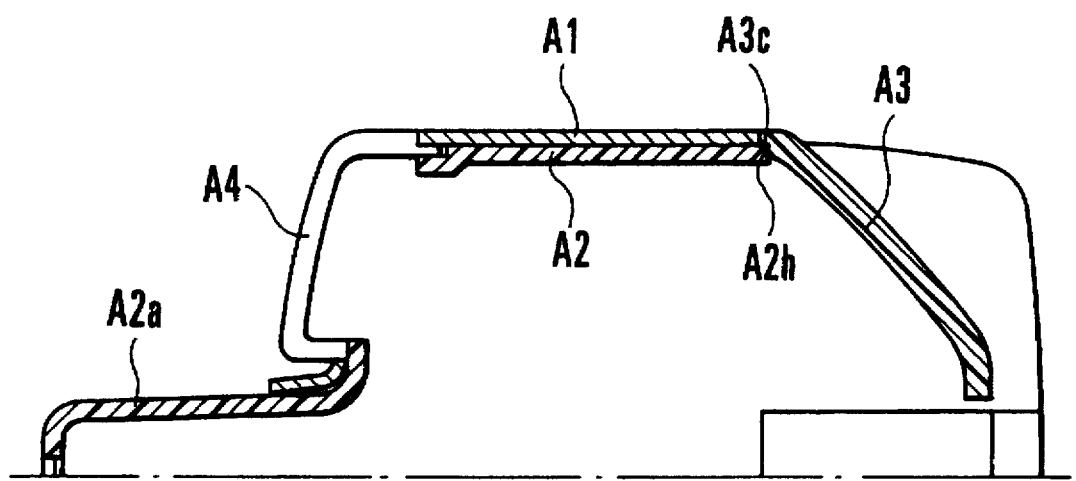
FIG. 6 is a longitudinal sectional view showing a socket and spigot joint of an overlapping part of the front and rear covers of the camera of FIG. 4.
Figure 7:
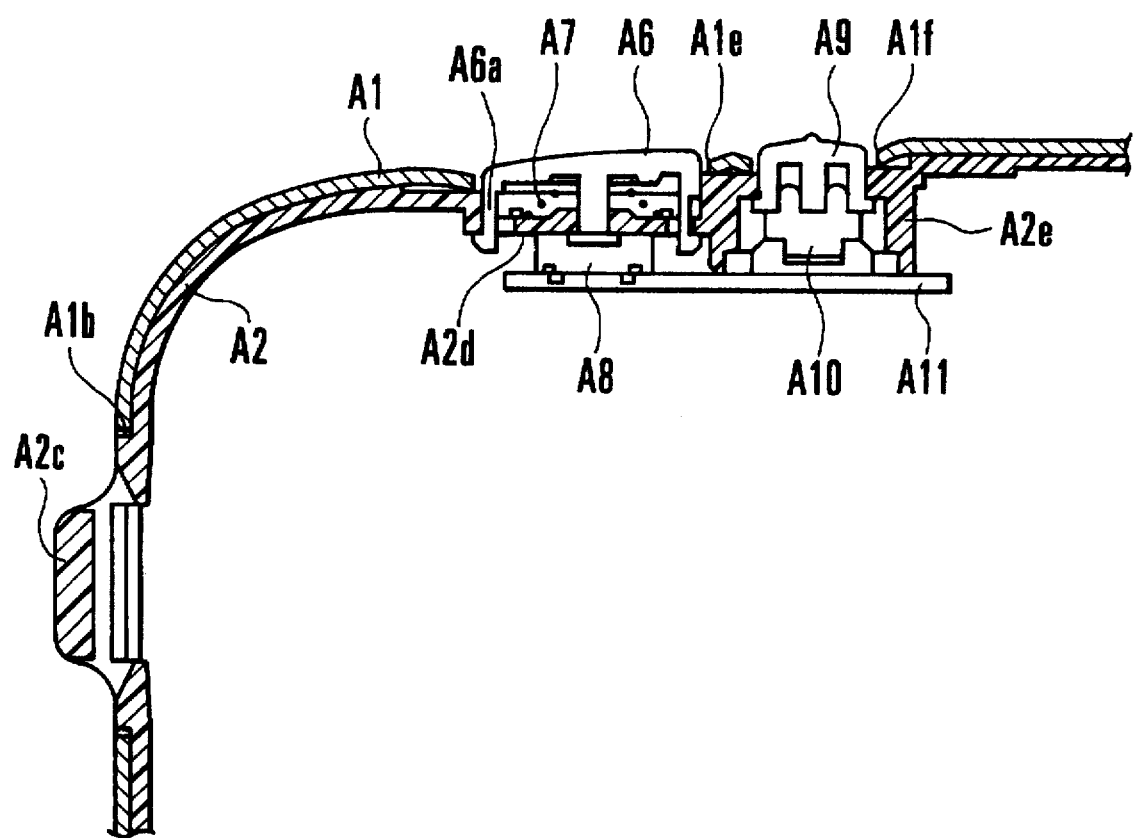
FIG. 7 is a sectional view showing how a release button and a zoom button of the camera of FIG. 4 are mounted.

FIG. 4 is an exploded oblique view showing a camera which is a third embodiment of this invention with main external fitting parts included in the illustration. FIG. 5 is a longitudinal sectional view of the camera showing a hook claw part which is arranged to combine front and rear covers. FIG. 6 is another longitudinal sectional view of the camera showing a socket and spigot joint between the front and rear covers. FIG. 7 is a sectional view of the camera which is the third embodiment showing a release button and a zoom button as in their states of being mounted on the upper part of the camera.

Referring to FIGS. 4 to 7, an aluminum cover A1 is mode of aluminum. An inner front cover A2 is formed by molding and is of a color akin to that of the aluminum cover A1. The inner front cover A2 has an outside part A2a which covers the protruding part of a lens barrel, a bottom cover part A2b which is also an appearance (outer) part, and a strap passing part A2c. These parts A2a, A2b and A2c are formed in one body. The protruding part A2a which is provided for the lens barrel protrudes further than a protruding part A1a of the aluminum cover A1. The strap passing part A2c is exposed through a cutout A1b formed in the aluminum cover A1. The edge part A1aa of the protruding part A1a and the edge part A1bb of the cutout A1b of the aluminum cover A1 are finished by diamond cutting. Further, the aluminum cover A1 is stuck to the the inner front cover A2 into one body by means of a double coated tape or an adhesive.

A rear cover A3 is formed by molding. As shown in FIGS. 4 and 5, hook claws A3a are formed integrally with the rear cover A3 and are arranged to engage the edge parts of the a rectangular holes A2f formed in the inner front cover A2. Spigots A3b are also formed integrally with the rear cover A3 and are arranged to be fitted into cutout recess parts A2g formed in the inner front cover A2. Meanwhile, as shown in FIG. 6, protruding parts A2h are formed on the inner front cover A2 and are arranged to be fitted into recessed parts A3c formed in the rear cover A3. The rear cover A3 and the inner front cover A2 are thus arranged to be simply and reliably coupled with each other by means of these parts in conjunction with the action of the hook claws A3a. The structural arrangement of the third embodiment is thus arranged to withstand static pressure applied from outside. A camera body which is not shown but contains various mechanisms therein is thus covered with the front and rear covers A2 and A3.

An AF light projecting and receiving window A4 which includes a visual light cutting filter material consists of a viewfinder window hole A4c and a light measuring window hole A4d. These window holes A4c and A4d respectively have transparent members (not shown) mounted thereon. There are provided protruding ribs A4b which are arranged to have two upper parts, and one part on the left side and another part on the right side are formed integrally with the window A4 with a stepped level difference from the appearance (outside) surface A4a.

A flash device window A5 has an appearance (outside) surface A5a. A Fresnel lens is formed integrally with the flash device window A5 right on the reverse side of the outside surface A5a. A nonappearance part A5b extends over the whole peripheral part of the flash device window A5 with a stepped level difference from the appearance (or outside) surface A5a.

The AF light projecting and receiving window A4 is fitted into the hole A1c of the aluminum cover A1, in such a way as to have its appearance surface A4a show up, before the aluminum cover A1 and the inner front cover A2 are cemented together. At the same time, the flash device window A5 is also fitted into a hole A1d of the aluminum cover A1 in such a way as to have its appearance part A5a show up. After that, the protruding ribs A4b of the AF light projecting and receiving window A4 and the nonappearance part A5b of the flash device window A5 are inserted in between the aluminum cover A1 and the inner front cover A2. The AF light projecting and receiving window A4 and the flash device window A5 are thus held in their place by cementing the aluminum cover A1 and the inner front cover A2 together.

The flash device window A5 is provided with walls on its upper side A5c and its right side A5d and are arranged to prevent a leak from the flash device by prolonging a creep distance between the aluminum cover A1 and a reflector of the flash device which is not shown.

In FIG. 7, the illustration includes a release button A6, a voluted compression spring A7 and a release switch A8. The release button A6 and the compression spring A7 are held within a release button guide part A2d of the inner front cover A2 by a hooking action of claw parts A6a of the release button A6 in a state of charging the compression spring A7. The illustration includes also a zoom button A9 and a rubber switch A10, which are inserted into a zoom button guide part A2e of the inner front cover A2. The zoom button guide part A2e is arranged to have a part shaped in such a way as to prevent the zoom button A9 from pulling out and a guide part shaped to decide the position of the rubber switch A10. A printed circuit board A11 is arranged to have the release switch A8 soldered thereto. A part of the printed circuit board A11 where a conducting part disposed on the bottom part of the rubber switch A10 comes into contact has a pattern in an exposed state. Further, the printed circuit board A11 is secured to a part of the camera body which is not shown. With the embodiment arranged in this manner, the window parts, buttons, etc., can be arranged as parts belonging to the unit of the front cover to facilitate and simplify manufacturing and assembly processes.

A fourth embodiment of this invention is next described with reference to FIG. 8 as follows:

Referring to FIG. 8, An aluminum cover A21 is made of aluminum. The aluminum cover A21 has a lens barrel cover part A21a which is arranged to protrude to a short extent in the neighborhood of a lens barrel. Since the protruding extent of the part A21a is not much, this part A21a is formed integrally with the aluminum cover A21 by pressing. An inner cover A22 is of about the same color as the cover A21 and is formed by molding. The inner cover A22 is disposed over the upper part and partly on one side of the camera. A strap passing part A22c is formed as an appearance part integrally with the inner cover 22. The inner cover A22 is cemented to the inner side of the aluminum cover A21 integrally with the latter. Further, for reliable coupling with a rear cover A23, the inner cover A22 is provided with the lock mechanism which is described in the foregoing. The lock mechanism includes rectangular holes A22f which engage hook claws A23a provided on the rear cover A23, recessed parts A22g in which spigots A23b formed on the rear cover A23 are fitted, and protruding parts A22h which are fitted into recessed parts A23c formed in the rear cover A23. The fourth embodiment is also arranged to allow an AF light projecting and receiving window A24 and a flash device window A25 to be fitted into the cover in the same manner as the third embodiment. The guide parts (A22d and A22e) for a release button and a zoom button are also arranged in the same manner as described in the foregoing for the third embodiment.

The edge part A21aa of the protruding part A21a and the edge part A21bb of a cutout A21b of the aluminum cover A21 are finished by diamond cutting.

As described in the foregoing, in each of the embodiments described, a part of a cover assembly is made of metal while another part of the cover assembly is formed with a molded part. Diamond cutting is applied to the edge part of the metal part particularly at a boundary between the parts which are of different materials and are in about the same color. As a result, the boundary between the two cover parts comes to show a glossy surface which is in the color of the metal material. The presence of the glossy surface makes the slight difference in color between the two cover parts less conspicuous to obviate the necessity of any elaborate blending process on the different materials of these cover parts. Further, since the glossy surface adds luster in part to the appearance and emphasizes that the cover is made of metal, the design of the camera can be upgraded.

Further, the operation members exposed through holes or cutout parts provided in the metal cover are arranged to be approximately of the same color as that of the metal cover. With diamond cutting applied to the edges of the holes or those of the cutout parts, the slight difference between the color of the operation members and that of the cover can be made to be less conspicuous. Further, with the diamond cutting part along the edge of each hole cut into a large chamfered shape, i.e., to have a large slanting face, the chamfered part facilitates insertion of a finger in manipulating the operation member.

What is claimed is:
1. A camera comprising:
   a) a metallic external member of a camera body, said member having an opening whose edge portion is protruded and machined out;
   b) a molded inner member of said camera body formed by a lens barrel part, wherein, when said metallic external member is mounted on said molded inner member, said lens barrel part of said molded inner member penetrating through said opening of said metallic external member to position said molded inner member.

2. A camera according to claim 1, wherein said molded inner member is formed with a synthetic resin.

3. A camera according to claim 1, wherein said molded inner member is arranged to have about the same shape as said metallic outer member.

4. A camera comprising:
   a) a metallic outer member of a camera body;
   b) a molded inner member of said camera body; and
   c) an optical member having a lens interposed in between said molded inner member and said metallic outer member and secured to said camera body.

5. A camera according to claim 4, wherein said molded inner member is formed with a synthetic resin.

6. A camera according to claim 4, wherein said optical member having a lens is a lens of a flash device.

7. A camera according to claim 4, wherein said optical member having a lens is a member which forms an optical system for a viewfinder.

8. A camera according to claim 4, wherein said optical member having a lens is a member which forms a light measuring optical system.

9. A camera according to claim 4, wherein said optical member having a lens is a member which forms a focus adjusting device.

10. A camera having a camera body, said camera body comprising:
    a) a molded inner member having a predetermined color; and
    b) a metallic external member having the same color as said predetermined color of said molded inner member except for a boundary portion, wherein said molded inner member is partially covered by said metallic external member, each of which is situated to be externally visible, and said boundary portion of said metallic external member covering said molded inner member is located adjacent to a portion of said molded inner member not covered by said metallic external member when said metallic external portion covers said molded inner member, and said boundary portion is machined out for producing a color different from the predetermined color.

11. A camera according to claim 10, wherein a lens barrel part is formed in said plastic case member.

12. A camera according to claim 10, wherein said metallic case member has at least a portion overlapping with said plastic case member.

13. A camera according to claim 11, wherein said metallic case member is formed so as to cover said plastic case member and provided with a hole to expose externally said lens part of said plastic case member, an edge surface of said hole being ground out.

* * * * *